US008184157B2

(12) United States Patent
Mittal

(10) Patent No.: US 8,184,157 B2
(45) Date of Patent: May 22, 2012

(54) GENERALIZED MULTI-SENSOR PLANNING AND SYSTEMS

(75) Inventor: Anurag Mittal, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 1464 days.

(21) Appl. No.: 11/636,955

(22) Filed: Dec. 11, 2006

(65) Prior Publication Data

US 2008/0007720 A1  Jan. 10, 2008

Related U.S. Application Data

(60) Provisional application No. 60/751,115, filed on Dec. 16, 2005.

(51) Int. Cl.
H04N 7/18 (2006.01)
(52) U.S. Cl. ......... 348/143; 348/153; 348/159; 348/169
(58) Field of Classification Search .................. 348/143, 348/152–155, 159, 169–172; 382/103
See application file for complete search history.

(56) References Cited

U.S. PATENT DOCUMENTS

| 5,745,126 | A  | * | 4/1998 | Jain et al. ............... 382/154 |
| 7,512,250 | B2 | * | 3/2009 | Lim et al. ............... 382/103 |
| 7,961,215 | B2 | * | 6/2011 | Lim et al. ............... 348/143 |
| 2006/0187305 | A1 | * | 8/2006 | Trivedi et al. ............ 348/169 |
| 2006/0204077 | A1 | * | 9/2006 | Lim et al. ............... 382/154 |
| 2007/0222553 | A1 | * | 9/2007 | Lim et al. ............... 340/3.1 |
| 2010/0259539 | A1 | * | 10/2010 | Papanikolopoulos et al. ............. 345/420 |

OTHER PUBLICATIONS

Lim et al.; Fast Illumination-invariant Background Subtraction using Two Views: Error Analysis, Sensor Placement and Applications; Jul. 25, 2005.*
Tarabanis et al.; A Survey of Sensor Planning in Commter Vision; IEEE Transactoion on Robotics and Automation, vol. 11. No. 1, Feb. 1995.*
Xing Chen and James Davis, "Camera placement considering occlusion for robust motion capture." Technical Report CS-TR-2000-07, Stanford University, Dec. 2000.
R.T. Collins, A.J. Lipton, H. Fujiyoshi, and T. Kanade, "Algorithms for cooperative multisensor surveillance." in *Proceedings of the IEEE*, 89(10): 1456-1477, Oct. 2001.
D.J. Cook, P. Gmytrasiewicz, and L.B. Holder, "Decision-theoretic cooperative sensor planning." in *PAMI*, 18(10): 1013-1023, Oct. 1996.
T.J. Darrell, 0. Demirdjian, N. Checka, and P.F. Felzenszwalb, "Plan-view trajectory estimation with dense stereo background models." in *ICCV*, pp. II: 628-635, Vancouver, Canada, Jul. 2001.
L. Ingber, "Very fast simulated re-annealing." in *Mathematical Computer Modeling*, 12: 967-973, 1989.
S. Khan and M. Shah, "Consistent labeling of tracked objects in multiple cameras with overlapping fields of view." in *PAMI*, 25(10): 1355-1360, Oct. 2003.

(Continued)

*Primary Examiner* — Abdullahi Salad
*Assistant Examiner* — Jimmy H Tran
(74) *Attorney, Agent, or Firm* — Donald B. Paschburg

(57) ABSTRACT

A method is disclosed for the analysis of scenarios where there are dynamically occurring objects capable of occluding each others. Application of the method in vision systems is also disclosed. Methods for incorporating visibility constraints for occluding scenarios are provided in a multi-camera setting. Other static constraints such as image resolution and field-of-view, and algorithmic requirements such as stereo reconstruction, face detection and background appearance are also addressed. A generic framework for sensor planning is also provided.

17 Claims, 9 Drawing Sheets

OTHER PUBLICATIONS

K.N. Kutulakos and C.R. Dyer, "Recovering shape by purposive viewpoint adjustment." in *IJCV*, 12(2-3): 113-136, Apr. 1994.

A. Mittal and L.S. Davis, "M2tracker: A multi-view approach to segmenting and tracking people in a cluttered scene." in *IJCV*, 51(3):189-203, Feb. 2003.

A. Mittal and L.S. Davis, "Visibility analysis and sensor planning in dynamic environments." in *ECCV* p. III: 543 ff., Prague, Czech Republic, May 2004.

M.K. Reed and P.K. Allen, "Constraint-based sensor planning for scene modeling." in *PAMI*, 22(12): 1460-1467. Dec. 2000.

Yi Shang, "*Global Search Methods for Solving Nonlinear Optimization Problems.*", PhD thesis, University of Illinois at Urbana-Champaign, 1997.

J. Spletzer and C.J. Taylor, "A framework for sensor planning and control with applications to vision guided multi-robot systems." in *CVPR*, Kauai, Hawaii, 2001.

C. Stauffer and W.E.L. Grimson, "Learning patterns of activity using real-time tracking." in *PAMI*, 22(8): 747-757, Aug. 2000.

Y. Ye and J.K. Tsotsos, "Sensor planning for 3d object search." in *CVIU*, 73(2):145-168, Feb. 1999.

\* cited by examiner

US 8,184,157 B2

GENERALIZED MULTI-SENSOR PLANNING AND SYSTEMS

CROSS-REFERENCE TO RELATED APPLICATIONS

This application claims the benefit of U.S. Provisional Application No. 60/751,115 filed Dec. 16, 2005, which is incorporated herein by reference.

BACKGROUND OF THE INVENTION

The present invention relates to vision, surveillance and camera systems, including the optimal sensor configurations of such systems.

Systems utilizing multiple visual sensors have become essential in many applications. Surveillance and monitoring, industrial automation, transportation and automotive and medical systems are a few of the important application domains. Existing research has mainly focused on improving the algorithms deployed in these systems, while little focus has been given to the placement of sensors for optimal system performance.

Scenarios for vision systems where there are dynamically occurring objects capable of occluding each other have not been adequately addressed. Accordingly methods or systems providing improved performance for vision systems and multi-sensor planning are required.

SUMMARY OF THE INVENTION

One aspect of the present invention presents a novel method and system that will provide a broad advantage to a vision system.

In accordance with another aspect of the present invention, a method for determining an optimal sensor configuration in a vision system is provided. The method includes determining a capture quality function of an object at a plurality of locations for each of a plurality of sensor configurations, for each of the plurality of sensor configurations, using the capture quality function determined at the plurality of locations to determining a cost function, and determining an optimal sensor configuration based on the cost function determined for each of the plurality of sensor configurations.

In accordance with another aspect of the present invention, the capture quality function depends on probabilities associated with an event set of objects.

In accordance with a further aspect of the present invention, the cost function associated with one of the sensor configuration is provided by $$C(s) = -\int_{R_i} \int_0^{2\pi} \lambda(x, \theta) q_s(x, \theta) d\theta dx,$$

wherein $q_S$ is the capture quality.

A vision system having a plurality of sensors configured by the above method is also provided by the present invention.

DESCRIPTION OF A PREFERRED EMBODIMENT

Figure 1:
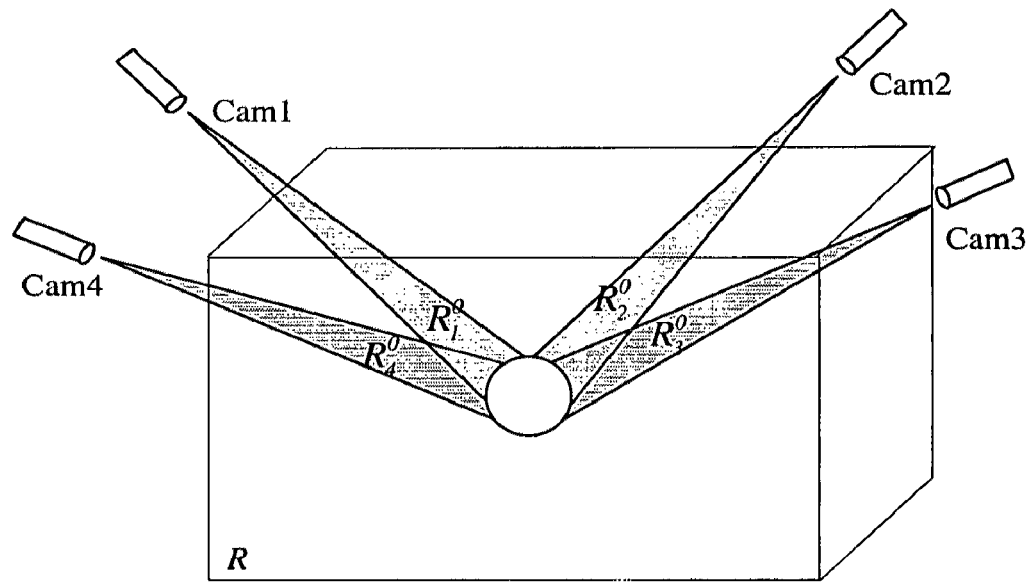
FIG. 1 illustrates a scene geometry for a 3D case in accordance with an aspect of the present invention.

Systems utilizing multiple visual sensors have become essential in many applications. Surveillance and monitoring, industrial automation, transportation and automotive and medical systems are a few of the important application domains. Existing research has mainly focused on improving the algorithms deployed in these systems, while little focus has been given to the placement of sensors for optimal system performance. Each system also has its own set of requirements. In security systems, for instance, the captured video streams may be inspected either manually, or a more advanced computerized system may be utilized to detect spurious activity automatically. Furthermore, automated people detection and tracking systems may have different objectives. Some systems utilize multiple closely-spaced cameras for the purpose of accurate stereo matching as described in T. J. Darrell, O. Demirdjian, N. Checka, and P. F. Felzenszwalb, "Plan-view trajectory estimation with dense stereo background models." in *ICCV*, pages II: 628-635, Vancouver, Canada, July 2001. Others utilize widely separated cameras for maximizing the object visibility in a dense situation such as described in A. Mittal and L. S. Davis, "M2tracker: A multi-view approach to segmenting and tracking people in a cluttered scene." in *IJCV*, 51(3):189-203, February 2003 and S. Khan and M. Shah, "Consistent labeling of tracked objects in multiple cameras with overlapping fields of view." in *PAMI*, 25(10): 1355-1360, October 2003. Still others such as C. Stauffer and W. E. L. Grimson, "Learning patterns of activity using real-time tracking." in *PAMI*, 22(8): 747-757, August 2000, Q. Cai and J. K. Aggarwal, "Tracking human motion in structured environments using a distributed-camera system." in *PAMI*, 21(11): 1241-1247. November 1999, R. T. Collins, A. J. Lipton, H. Fujiyoshi, and T. Kanade, "Algorithms for cooperative multisensor surveillance." in Proceedings of the *IEEE*, 89(10): 1456-1477, October 2001, and A. Rahimi, B. Dunagan, and T. J. Darrell, "Simultaneous calibration and hacking with a network of non-overlapping sensors." in *CVPR*, pages I: 187-194. 2004, use multiple cameras for the main purpose of increasing the coverage area by utilizing non-overlapping field-of-view cameras. A generic formulation will be provided as one aspect of the present invention that can be customized to find good sensor configurations for any of the previously mentioned systems.

Sensor planning has been researched quite extensively, and there are several different variations depending on the application. A popular set of methods, called next-view planning, attempt to build a model of the scene incrementally by successively sensing the unknown world from effective sensor configurations using the information acquired about the world up to this point such as described in J. Miura and K. Ikeuchi, "Task-oriented generation of visual sensing strategies." in *ICCV*, pages 1106-1113, Boston, Mass., 1995, Y. Ye and J. K. Tsotsos, "Sensor planning for 3d object search." in *CVIU*, 73(2):145-168, February 1999, D. J. Cook, P. Gmytrasiewicz, and L. B. Holder, "Decision-theoretic cooperative sensor planning." in *PAMI*, 18(10): 1013-1023, October 1996, J. Mayer and R. K. Bajcsy, "Occlusions as a guide for planning the next view." in *PAMI*, 15(5): 417-433, May 1993, K. N. Kutulakos and C. R. Dyer, "Recovering shape by purposive viewpoint adjustment." in *IJCV*, 12(2-3): 113-136, April 1994, A. Cameron and H. F. Durrant-Whyte, "A bayesian approach to optimal sensor placement." in *IJRR*, 9(5): 70-88, 1990, and G. Hager and M. Mintz, "Computational methods for task-directed sensor data fusion and sensor planning." in *IJRR*, 10(4):285-313. August 1991. A related set of methods such as described in S. B. Kang, S. M. Seitz, and P. P. Sloan, "Visual tunnel analysis for visibility prediction and camera planning." in *CVPR*, pages II: 195-202, Hilton Head, S.C. June 2000, have focused on finding good sensor positions for capturing a static scene from desirable viewpoints assuming that some geometric information about the scene is available. Bordering on the field of graphics, the main contribution of such methods is to develop efficient methods for determining the view of the scene from different viewpoints.

Methods that are related to the present invention are those that assume that complete geometric information is available and determine the location of static cameras so as to obtain the best views of a scene. This problem was originally posed in the computational geometry literature as the "art-gallery problem" such as described in Joseph O'Rourke, "*Art Gallery Theorems and Algorithms.*" Oxford University Press, August 1987. The traditional formulation of such problem assumes the simple assumption that two points are called visible if the straight line segment between them lies entirely inside the polygon. Even with such simple definition of visibility, the problem is NP-complete.

Some of the recent work has concentrated on incorporating a few more constraints like incidence angle and range into the problem and obtain an approximate solution to the resultant NP-complete problem via randomized algorithms such as described in H. González-Banos and J. C. Latombe, "A randomized art-gallery algorithm for sensor placement." in *SCG*, Medford, Mass., June 2001. Several researchers such as C. K. Cowan and P. D. Kovesi, "Automatic sensor placement from vision last requirements." in *PAMI*, 10(3): 407-416, May 1988, M. K. Reed and P. K. Allen, "Constraint-based sensor planning for scene modeling." in *PAMI*, 22(12): 1460-1467. December 2000, K. Tarabanis, R. Y. Tsai, and A. Kaul, "Computing occlusion-free viewpoints." in *PAMI*, 18(3): 279-292, March 1996, J. Mayer and R. K. Bajcsy, "Occlusions as a guide for planning the next view." in *PAMI*, 15(5): 417-433, May 1993, S. K. Yi, R. M. Haralick, and L. G. Shapiro, "Optimal sensor and light-source positioning for machine vision." in *CVIU*, 61(1): 122-137, January 1995, and J. Spletzer and C. J. Taylor, "A framework for sensor planning and control with applications to vision guided multi-robot systems." in *CVPR*, Kauai, Hi., 2001, have studied and incorporated more complex constraints based on several factors not limited to (1) resolution, (2) focus, (3) field of view, (4) visibility, (5) view angle, and (6) prohibited regions. However, the problem becomes too complex to be amenable to fast approximation solutions.

In addition to the "static" constraints considered so far, there are additional constraints that arise when dynamic obstacles are present. Such constraints are essential to analyze since system performance is a function of object visibility. In Xing Chen and James Davis, "Camera placement considering occlusion for robust motion capture." Technical Report CS-TR-2000-07, Stanford University, December 2000, it was proposed to combine visibility and static constraints via a weighted sum of the error due to the two factors. On the other hand, A. Mittal and L. S. Davis, "Visibility analysis and sensor planning in dynamic environments." in *ECCV*, page III: 543 ff., Prague, Czech Republic, May 2004 proposed maximization of the visibility while static constraints were analyzed simply as hard constraints that would either be satisfied or not at a given location. It is one aspect of the present invention to provide a more general approach towards integration of these two types of constraints. Analysis of visibility constraints and determination of multi-camera visibility rates will be utilized as described in A. Mittal and L. S. Davis, "Visibility analysis and sensor planning in dynamic environments." in *ECCV*, page III: 543 ff., Prague, Czech Republic, May 2004. Integration of such analysis with a variety of static constraints and application requirements leads to a generic formulation for sensor planning. Customization of the method for a given system allows the method to be utilized for a variety of different tasks and applications.

Visibility Analysis

In this section, a brief review and generalization of visibility analysis results from A. Mittal and L. S. Davis, "Visibility analysis and sensor planning in dynamic environments." in *ECCV*, page III: 543 ff., Prague, Czech Republic, May 2004, that are pertinent to the present invention will be provided.

Figure 2:
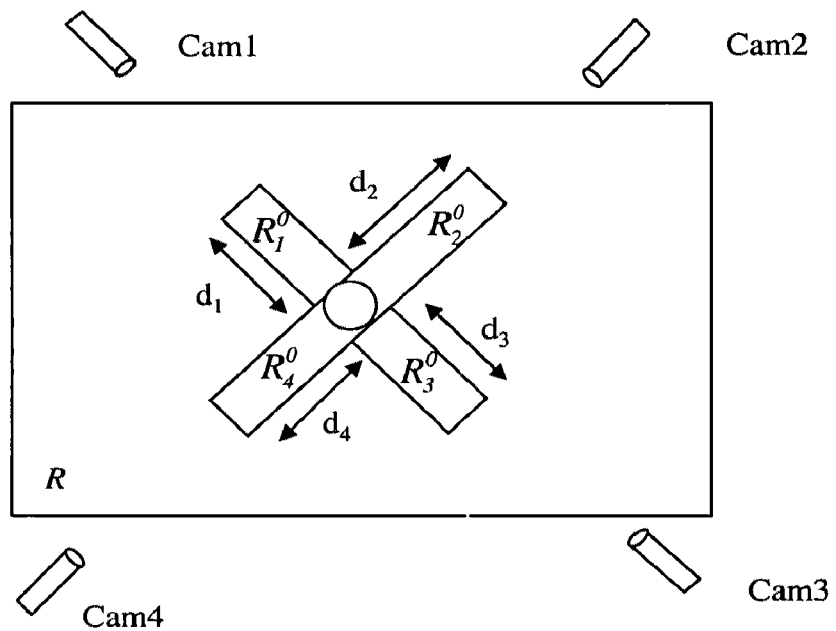
FIG. 2 illustrates a scene geometry for a 2.5D case in accordance with an aspect of the present invention.

Since the particular application domain might contain either two or three dimensions, the general case of an m dimensional space will be considered. Assume a region $R \subset \square^m$ of content A observed by n sensors as shown in FIG. 1 and FIG. 2. The term "content" is used in a general sense, such that it is the area of R if m=2, and it is the volume if m=3. Let $\epsilon_i$ be the event that a target object O at location $L \in R$ in angular orientation $\theta$ is visible from sensor i. The definition of such "visibility" can be defined according to the application, e.g. visibility of only a part of the object might be sufficient. Then, it is useful to compute the following probabilities:

$$P(\varepsilon_i), i = 1 \ldots n \quad (1)$$

$$P(\varepsilon_i \cap \varepsilon_j), i, j = 1 \ldots n$$

$$\ldots$$

$$P\left(\bigcap_i \varepsilon_i\right)$$

In order to compute such probabilities, it is noted that there exists a region of occlusion $R_i^O$ for each sensor i such that the presence of another object in $R_i^O$ would cause O to not be visible from i as is shown in FIGS. 1 and 2. Note that this region of occlusion is dependent on the application-specific definition of visibility. For instance, one may require that all of the object be visible, or one may require visibility of only the object center. The content of $R_i^O$ is denoted by $A_i^O$. The content of an occluding object is denoted by $A_{ob}$.

Assuming that the objects are located uniformly and randomly in R with object density $\lambda$, it was shown in A. Mittal and L. S. Davis, "Visibility analysis and sensor planning in dynamic environments." in *ECCV*, page III: 543 ff., Prague, Czech Republic, May 2004, that the probability that object O is visible from all of the sensors in a specified set $(i_1, i_2 \ldots i_m)$ is:

$$P\left(\bigcap_{i \in (i_1, i_2 \ldots i_m)} \varepsilon_i\right) \approx e^{\frac{2a-b}{2a(a-b)}} \quad (2)$$

where $$a = \frac{1}{\lambda A^O_{(i_1, i_2 \ldots i_m)}}, \quad b = \frac{A_{ob}}{A^O_{(i_1, i_2 \ldots i_m)}} \quad (3)$$

and $A_{(i_1, i_2 \ldots i_m)}^O$ is the content of the combined region of occlusion $R_{i_1, i_2 \ldots i_m}^O$ for the sensor set $(i_1, i_2 \ldots i_m)$ formed by the "geometric" union of the regions of occlusion $R_{i_p}^O$ for the sensors in this set, i.e.

$$R^O_{(i_1, \ldots i_m)} = \bigcup_{p=1}^{m} R^O_{i_p}.$$

It may be noted that a is the effect on the probability due to the presence of an object, and b is a correction to such effect due to the finite object size.

More generally, the object density ($\lambda$) is a function of the location and may also be influenced by the presence of nearby objects since objects typically appear in groups. Let $\lambda(x_c|x_O)$ be the density at location $x_c$ given that visibility is being calculated at location $x_O$. Then, it can be shown that the variables a and b in Eq. [3] are modified such that $$a = \frac{1}{\int_{R^O_{(i_1, \ldots i_m)}} \lambda(x_c | x_0) dx_c}, \quad b = \frac{A_{ob} \cdot \lambda_{avg}}{\int_{R^O_{(i_1, \ldots i_m)}} \lambda(x_c | x_0) dx_c} \quad (4)$$

where $\lambda_{avg}$ is the average object density in the region.

Static Constraints and the Capture Quality

Several stationary factors affect the quality of the data acquired by a camera. Such factors will first be described briefly and then shown how they can be incorporated into a generic formulation that enables optimization of the sensor configuration with respect to user-defined criteria.

"Static" Constraints

Some of the static constraints affecting the view of the camera are described next. Many of these constraints may be considered in either of two ways: hard constraints that must be satisfied at the given location for visibility, or soft constraints that may be measured in terms of a measure for the quality of the acquired data. They are:

1. FIELD OF VIEW: Cameras have a limited field of view, and a constraint can be specified terms of a maximum angle from a central camera direction.
2. OBSTACLES: Fixed high obstacles like pillars block the view of a camera, and such constraint can be verified for a given object location.
3. PROHIBITED AREAS: There might also exist prohibited areas like desks or counters where people are not able to walk. These areas have a positive effect on the visibility in their vicinity since it is not possible for obstructing objects to be present within such regions.
4. IMAGE RESOLUTION: The resolution of an object in an image reduces as the object moves further away from the camera. Therefore, meaningful observations are possible only up to a certain distance from the camera.
5. ALGORITHMIC CONSTRAINTS: There are several algorithmic constraints that may exist. Such constraints may also be more complex involving inter-relationships between the views of several cameras. Stereo matching across two or more cameras is an example of such a constraint and involves a complex integration of several factors including image resolution, the maximum distortion of a view that can occur from one view to the other and the triangulation error.
6. VIEWING ANGLE: An additional constraint exists for the maximum angle $\alpha_{max}$ at which the observation of an object is meaningful. Such observation can be the basis for performing some other tasks such as object recognition. When the vertical viewing angle is considered, this constraint translates into a constraint on the minimum distance from the sensor that an object must be. The horizontal viewing angle can also be considered similarly by consideration of the angle between the object orientation and the camera direction.

The Capture Quality

Figure 3:
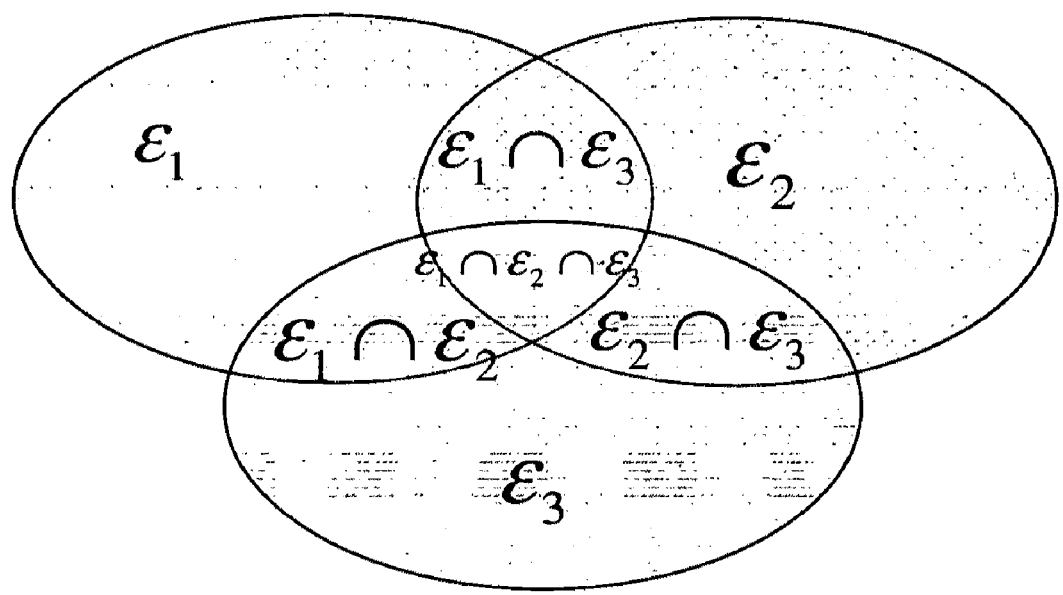
FIG. 3 illustrates the partitions of an event space in accordance with an aspect of the present invention.

In order to determine the quality or goodness of any given sensor configuration, the "static" constraints can be integrated into a single capture quality function $q_l(\theta)$ that measures how well a particular object at location l in angular orientation $\theta$ is captured by the given sensor configuration. Due to occlusions, however, such quantity is a random variable that depends on the occurrence of events $\epsilon_i$. The event space may be partitioned into the following disjoint sets as shown in FIG. 3:

No $\epsilon_i$ occurs, with quality: 0
Only $\epsilon_i$ occurs, with quality: $q(\epsilon_i)$
Only $\epsilon_i \cap \epsilon_j$ occurs, with quality: $q(\epsilon_i \cap \epsilon_j) \ldots$ $$\bigcap_i \varepsilon_i \text{ occurs, with quality: } q\left(\bigcap_i \varepsilon_i\right)$$

The event space may be partitioned into disjoint event sets. Here, only $\epsilon_i$, for instance, would only include event space that is not common with other events.

Such separation allows one to specify the quality measure for each of such events separately. More specifically, such quality function needs to be specified for all of such events. In other words, one needs to specify for all possible sets, the quality measure $q_l(i_1, \ldots, i_m, \theta)$ that refers to the capture quality obtained if an object at the location l in angular orientation $\theta$ is visible from all of the sensors in the given m-tuple i.e. the event $$\left(\bigcap_{i \in (i_1, \ldots i_m)} \varepsilon_i\right)$$

occurs.

To give some insight into such specification of the quality function, one can consider the case of stereo matching. In such an application, since visibility from at least two sensors would be required for matching, the capture quality $\{q_l(i, \theta)\}$, $i=1 \ldots n$ would be zero. For the terms involving two sensors, several competing requirements need to be considered. Under some simplifying assumptions, the error in the recovered depth due to image quantization may be approximated as being proportional to $\delta z \sim z^2/bf$, where z is the distance from the cameras, b is the baseline distance between the cameras, and f is the focal length. On the other hand, the angular distortion of the image of an object from one camera to the other may be approximated as $\theta_d \sim \tan^{-1}(b/z)$, and is directly related to the accuracy with which stereo matching may be performed. Furthermore, an increase in the distance from the cameras also decreases the size of the object view, which might further decrease the accuracy of stereo matching. Thus, in the perpendicular direction, the accuracy of stereo matching first increases with the distances from the cameras, and then decreases, while the quantization error increases with such distances. Thus, a quality function that peaks for some given distance and tapers off in either direction can be considered. Thus, for any given task requirement, a trade-off between different constraints is typically involved and it is up to the user to specify functions that define the desired behavior in such conditions.

Figure 5:
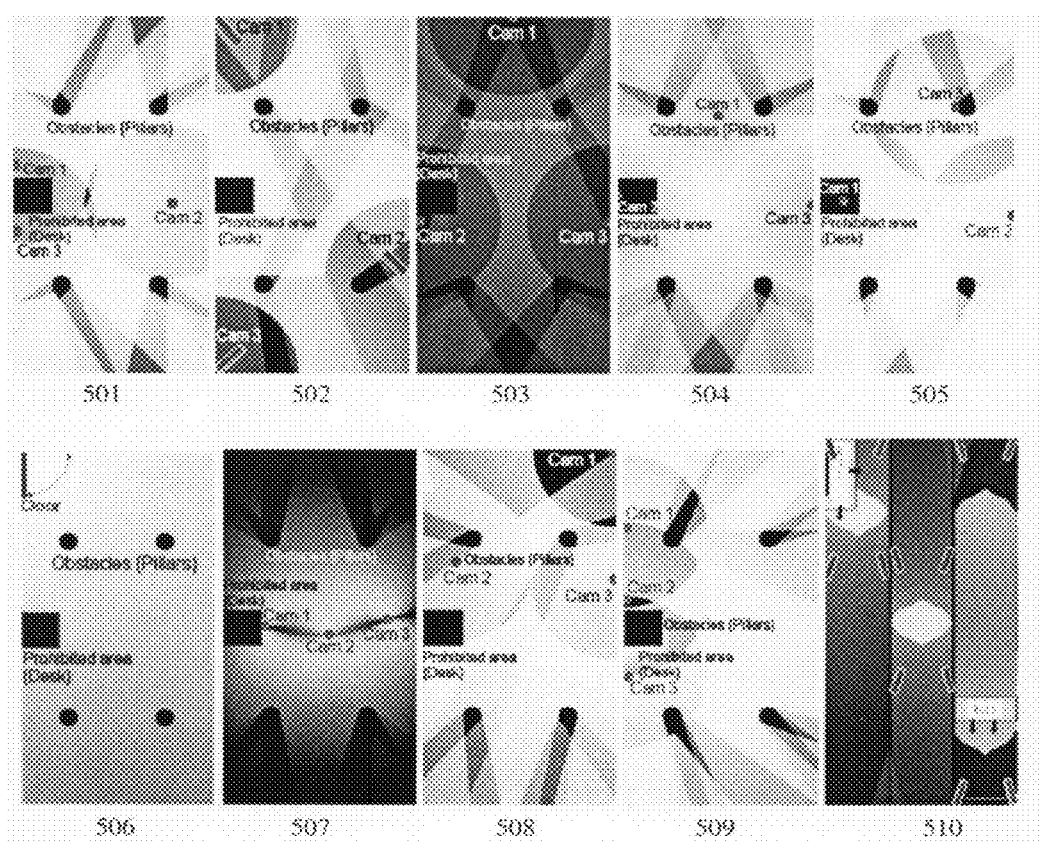
FIG. 5. is a series of images with different camera configurations in accordance with an aspect of the present invention.

Computation of probabilities of these disjoint events along with the specification of the capture quality associated with such events yields a probability function for the capture quality at a particular location (FIG. 5 illustrates an example where the function for a typical scene is averaged over the entire region of interest.). Given such a probability function, one can consider several integration measures of which the mean will be considered for simplicity purposes. The mean capture quality at a particular location for a particular object orientation $\theta$ may be written as:

$$q(\theta) = \sum_{\forall i} q(\varepsilon_i, \theta) P(\text{Only} \varepsilon_i) + \sum_{i<j} q(\varepsilon_i \cap \varepsilon_j) P(\text{Only} \varepsilon_i \cap \varepsilon_j) + \ldots + q\left(\bigcap_i \varepsilon_i, \theta\right) P\left(\text{Only} \bigcap_i \varepsilon_i\right)$$

Such expression may be rearranged to obtain:

$$q(\theta) = \sum_{\forall i} q^c(\varepsilon_i, \theta) P(\varepsilon_i) - \sum_{i<j} q^c(\varepsilon_i \cap \varepsilon_j, \theta) P(\varepsilon_i \cap \varepsilon_j) + \ldots + (-1)^{n+1} q^c\left(\bigcap_i \varepsilon_i, \theta\right) P\left(\bigcap_i \varepsilon_i\right) \quad (5)$$

where $q^c\left(\bigcap_{i \in (i_1, \ldots i_m)} \varepsilon_i, \theta\right)$ is defined as:

$$q^c\left(\bigcap_{i \in (i_1, \ldots i_m)} \varepsilon_i, \theta\right) = \sum_{i \in (i_1, \ldots i_m)} q(\varepsilon_i, \theta) - \sum_{i<j} q(\varepsilon_i \cap \varepsilon_j, \theta) + \ldots + (-1)^{m+1} q\left(\bigcap_{i \in (i_1 \ldots i_m)} \varepsilon_i, \theta\right) \quad (6)$$

This analysis yields a capture quality measure for each location and each angular orientation for a given sensor configuration. Such quality measure is integrated across the entire region of interest in order to obtain a quality measure for the given configuration. Such integration is considered next.

Integration of Quality across Space

The analysis presented so far yields a function $q_s(x, \theta)$, that refers to the capture quality of an object with orientation $\theta$ at location x given that the sensors have the parameter vector s. Such parameter vector may include, for instance, the location, viewing direction and zoom of each camera. Given such a function, one can define a suitable cost function in order to evaluate a given set of sensor parameters with regard to the entire region to be viewed. Such sensor parameters may be constrained further due to other factors. For instance, there typically exists a physical limitation on the positioning of the cameras (walls, ceilings etc.). The sensor planning problem can then be formulated as a problem of constrained optimization of the cost function. Such optimization will yield the optimum sensor parameters according to the specified cost function.

Several cost functions may be considered. One may define a cost function that maximizes the minimum quality in the region:

$$C(s) = -\min_{x \in R_i, \theta \in [0 \ldots 2\pi]} q_s(x, \theta)$$

Another cost function, and perhaps the most reasonable one in many situations is to define the cost as the negative of the average capture quality in a given region of interest:

$$C(s) = -\int_{R_i} \int_0^{2\pi} \lambda(x, \theta) q_s(x, \theta) d\theta dx \quad (7)$$

This cost function has been utilized to illustrate the present invention. Note that an additional parameter $\theta$ was added to the object density function in order to incorporate information about the object orientations into the density function. Since the orientation does not affect the occluding characteristics of an object, such parameter was integrated (and eliminated) for the visibility analysis presented previously.

Minimization of the Cost Function

Figure 4:
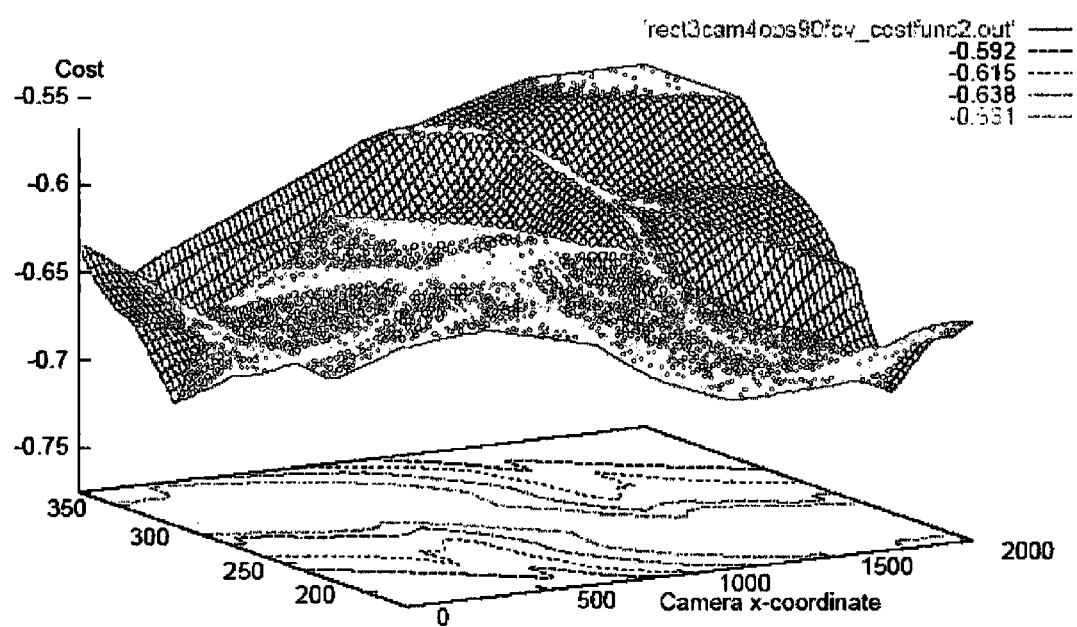
FIG. 4. is a 3D graph of a Cost Function in accordance with an aspect of the present invention.

The cost function defined by Equation 7 (as also other suitable ones) is highly complex and due to the variegated nature of the constraints, it is not possible to obtain a single method that optimizes such function in a very efficient manner. Furthermore, even for simple scenarios, it can be shown that the problem is NP-complete and not amenable to fast polynomial time solutions. FIG. 4 illustrates the cost function for the scene shown in FIG. 5 image 502 where, for illustration purposes, only two of the nine parameters have been varied. Even in this two dimensional space, there are two global minima and several local minima. Furthermore, the gradient is zero in some regions.

Due to the generality and characteristics of the cost function, a general method that is able to find the global minima of complex cost functions will be used. Simulated Annealing and Genetic Algorithms are two classes of algorithms that may be considered as described in Yi Shang, "*Global Search Methods for Solving Nonlinear Optimization Problems*", PhD thesis, University of Illinois at Urbana-Champaign, 1997. For experiments, a highly sophisticated simulated re-annealing software ASS was used. It was developed by L. Ingber and described in L. Ingber, "Very fast simulated re-annealing." in *Mathematical Computer Modeling*, 12: 967-973, 1989.

Using this algorithm, extremely good sensor configurations were obtained in a reasonable amount of time (5 minutes to a couple of hours on a Pentium IV 2.2 GHz PC, depending on the desired accuracy of the result, the number of dimensions of the search space and complexity of the scene). For low dimensional spaces (<4), where it was feasible to verify the results using full search, it was found that the algorithm quickly converged to a global minimum. For moderate dimensions of the search space (<8), the algorithm was again able to obtain the optimum solution, but only after some time. Although the optimality of the solution could not be verified by full search, such solution was assumed to be optimum since running the algorithm several times from different starting points and different annealing parameters did not alter the final solution. For very high dimensional spaces (>8), although the algorithm provided "good" solutions very quickly, it took several hours to converge to the best one. Some of the "optimal" solutions thus obtained will be illustrated in the next section.

Experiments

A formulation and a solution method for the generic sensor planning problem have been provided as an aspect of the present invention. It will now be demonstrated how the method may be customized for a variety of different task requirements. For simplicity, the specific 2.5D case will be considered of objects moving on a ground plane and sensors placed at some known heights $H_i$ from this plane. The objects are also assumed to have the same horizontal profile at each height, such that the area of their profile onto the ground is $A_{ob}$. Examples of such objects include cylinders, cubes, cuboids, and square prisms, and can adequately describe the objects of interest in many applications such as people detection and tracking.

It is also assumed that only visibility of the center line of the object is required and only up to a length h from its top. Then, assuming that the average "radius" of the object is r, the region of occlusion is a rectangle of width 2r and a distance $d_i$ from the object, that is proportional to the object's distance from sensor i:

$$d_i = (D_i - d_i)\mu_i = D_i \frac{\mu_i}{\mu_i + 1}, \text{ where } \mu_i = \frac{h}{H_i} \quad (8)$$

Then, one may approximate the area of the region of occlusion $R_i^o$ as $A_i^o \sim d_i(2r)$. These models enable one to reason about the particular application of people detection and tracking for objects moving on a plane.

Utilizing these assumptions, some synthetic examples will be considered first. Then we it will be shown, for some real scenes, how the method may be utilized for maximizing the performance of certain tasks such as face detection. Such optimization requires information about object characteristics and characterization of the algorithms to be used and it will be illustrated how such information may be determined.

Synthetic Examples

In the synthetic examples that will be considered, the following assumptions will be used. The objects occur randomly with object density $\lambda=1$ m$^{-2}$, object height=150 cm, object radius r=15 cm, minimum visibility height h=50 cm and maximum visibility angle $\alpha_{max}=45°$. The sensors are mounted H=2.5 m above the ground. The maps shown are capture quality maps scaled such that [0,1] maps onto [0,255]. First, a rectangular room of size 10 m×20 m is considered.

The first two examples [FIG. 5, scenes according to image 501 and 502] assume a simple quality function such that visibility from any direction is considered equally valid (i.e. the parameter θ is neglected) and fixed thresholds are put on the visibility distance from the camera based on camera resolution (maxdist$_{res}$) and maximum viewing angle $\alpha_{max}$(mindist$_{view}$):

$$q_x(\varepsilon_i, \theta) = \begin{cases} 1 \text{ if } mindist_{view} < d(x, cam) < maxdist_{res} \\ 0 \text{ otherwise} \end{cases} \quad (9)$$

Furthermore, for multiple sensor terms, the quality is defined simply as the quality of the sensor having the best view:

$$q\left(\bigcap_{i \in (i_1, \ldots i_m)} \varepsilon_i, \theta\right) = \max_{i \in (i_1, \ldots i_m)} q(\varepsilon_i, \theta) \quad (10)$$

Under this assumption, it is easy to verify that the quantity $q^c$ defined in Equation 6 becomes:

$$q^c\left(\bigcap_{i \in (i_1, \ldots i_m)} \varepsilon_i, \theta\right) = \min_{i \in (i_1, \ldots i_m)} q(\varepsilon_i, \theta) \quad (11)$$

Using mindist=5 m and maxdist=25 m, if the sensors have a field of view of 360° (omni-camera), configuration of image 501 in FIG. 5 was found optimum, while a field of view of 90° resulted in configuration of image 502 in FIG. 5. The omni-camera is used for the rest of the examples in this scene.

Figure 6:
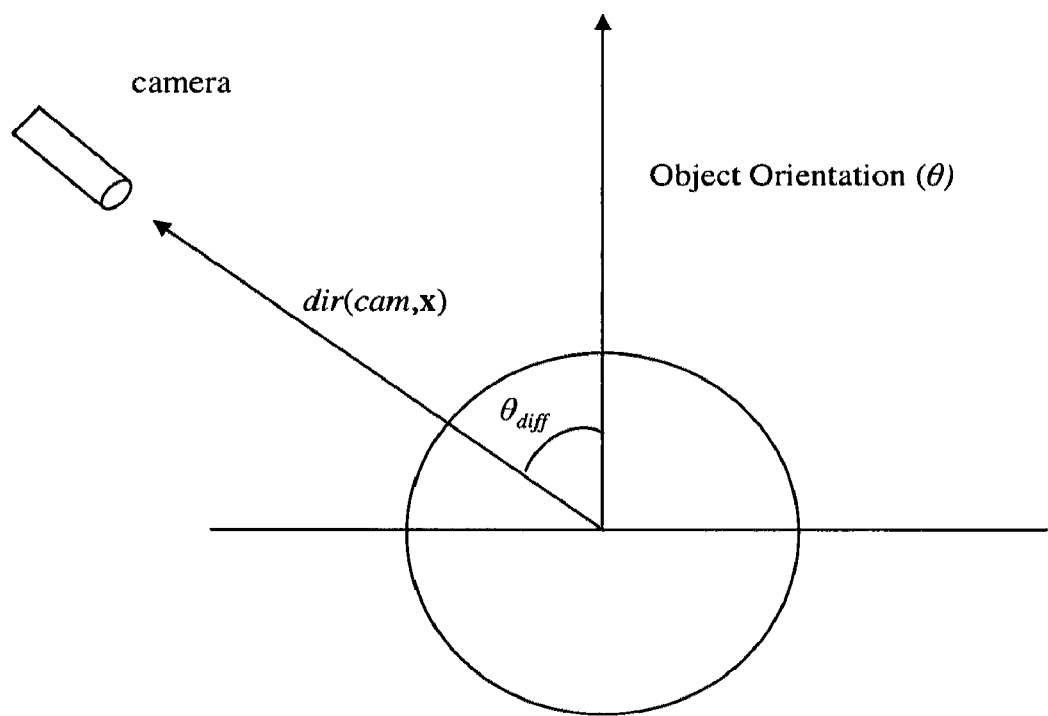
FIG. 6 is a diagram illustrating Object Orientation in relation to a camera in accordance with an aspect of the present invention.

Assuming that one requires visibility from all directions, one may alter the quality function as follows:

$$q_x(\varepsilon_i, \theta) = \begin{cases} 1 \text{ if } \theta_{diff} < \theta^{max} \\ \& d_{view}^{min} < d(x, cam) < d_{res}^{max} \\ 0 \text{ otherwise} \end{cases} \quad (12)$$

where $\theta^{max}$ is the maximum angular orientation at which the observation of the object is still considered meaningful, and $\theta_{diff}=abs(\theta-dir(cam, x))$ such that dir(cam, x) is the angular direction of the camera from the point of view of x as shown in FIG. 6. Assuming that $\theta^{max}=90°$, the sensor configuration shown in image 503 of FIG. 5 is obtained. Note that the cameras are now more spread out in order to capture the objects from many directions.

One may further expand the definition of the quality function in order to incorporate the camera distance constraints as soft constraints rather than hard ones. One possible assumption is that the quality decreases linearly with the camera distance when such distance is less than $d_{view}^{min}$, and decreases exponentially when such distance is above $d_{res}^{max}$. Furthermore, one may allow a soft constraint on the viewing orientation. One possibility is to assume that the quality deteriorates linearly as the angular orientation $\theta_{diff}$ increases between a low and high value. These factors may be incorporated into the quality measure by specifying:

$$q_x(\varepsilon_i, \theta) = H(\theta_{diff}) * \quad (13)$$

$$\begin{cases} 1 & \text{if } d_{view}^{min} < d(x, cam) < d_{res}^{max} \\ \frac{d(x, cam)}{d_{view}^{min}} & \text{if } d(x, cam) < d_{view}^{min} \\ \exp\left(-\frac{d(x, cam) - d_{res}^{max}}{d_{res}^{max}}\right) & \text{if } d(x, cam) > d_{res}^{max} \end{cases}$$

where

-continued $$H(\theta_{diff}) = \begin{cases} 1 & \text{if } \theta_{diff} < \theta^{min} \\ \frac{\theta_{diff} - \theta^{min}}{\theta^{max} - \theta^{min}} & \text{if } \theta^{min} < \theta_{diff} < \theta^{max} \\ 0 & \text{if } \theta_{diff} > \theta^{max} \end{cases} \quad (14)$$

Figure 7:
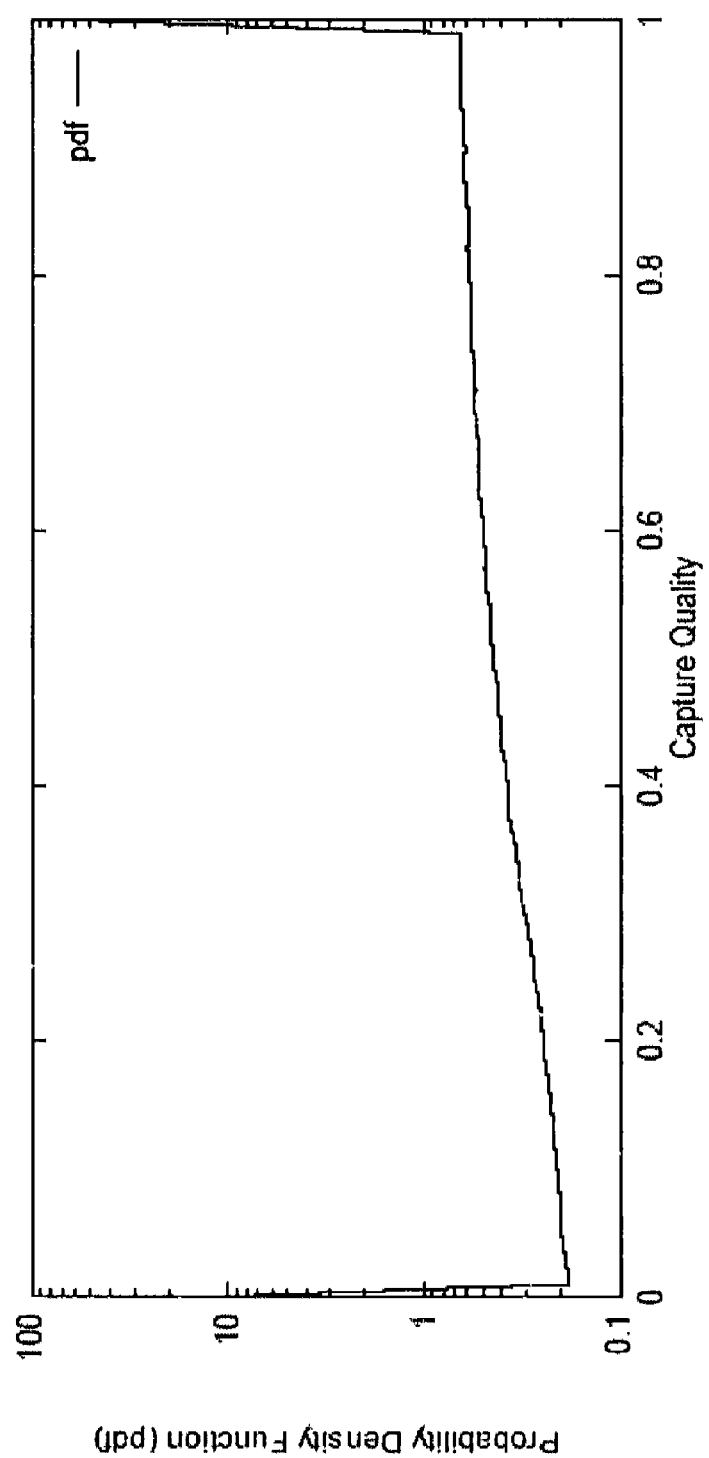
FIG. 7 is a graph of a probability density function in accordance with an aspect of the present invention.

Such quality measure leads to the sensor configuration as shown in image 504 of FIG. 5 when $\theta^{min}=\pi/2$ and $\theta^{max}=\pi$. Note that camera one moves inwards compared to the configuration as shown in image 503 of FIG. 5 since the directional visibility requirement has been made a little less rigid. The probability distribution for the capture quality for this case is shown in FIG. 7. Note the unusually high values for zero and one due to the possibilities of complete object occlusion and perfect capture in certain conditions. Using such information, one may be able to utilize more complex capture requirements. For instance, one may be able to specify that a certain percentile of the capture quality be maximized.

Relaxing the assumption of uniform density, if variable density is assumed such that the density is highest near the door and decreases linearly with the distance from it in the configuration as shown in image 506 of FIG. 5, the configuration as shown in image 505 of FIG. 5 was found to be the best. Note that, compared to the configuration as shown in image 501 of FIG. 5 the cameras move closer to the door in order to better capture the region with higher object density.

Next, a stereo assumption is considered such that matching across cameras and 3D reconstruction becomes an additional constraint. One can show that the error in triangulation for an omni-camera is proportional to:

$$e_{tr} \propto \sqrt{d_1^2+d_2^2+d_1 d_2 \cos(\alpha)}/\sin(\alpha) \quad (15)$$

where $d_1$ and $d_2$ are the distances of the object from the two cameras, and $\alpha$ is the angular separation between the two cameras as seen from the object. Although the error in matching is algorithm-dependent, a reasonable assumption is that:

$$e_m \propto d_1/\cos(\alpha/2)+d_2/\cos(\alpha/2) \quad (16)$$

Considering a quality function that uses a weighted average of the two errors: $q=-(w_1 e_{tr}+w_2 e_m)$, the configuration as shown in image 507 of FIG. 5 was found to be the best. Note that all the three cameras come closer to each other in order to be able to do stereo matching between any two of them.

In the final example for this scene, a case is considered where, because of algorithmic constraints, capture of an object with one of the walls as background is not useful. For instance, the wall may be painted a certain color and the objects may have a high probability of appearing in this color. Assuming that visibility with the top wall as background is not useful, the configuration as shown in image 508 of FIG. 5 is obtained. The same constraint with the left wall yields the configuration as shown in image 509 of FIG. 5. Note that some cameras move close to the prohibited wall in order to avoid it as the background.

Next, a more complex scene is considered where several constraints are to be satisfied simultaneously. In image 510 of FIG. 5, the scene of a "museum" is shown where the entrance is on the left upper corner and the exit is on the bottom right corner. One is required to view the faces of people as they enter or exit the scene. Additionally, 3D object localization is to be performed via stereo reconstruction for all parts of the scene. Note how the sensor placement varies in the three sections due to different combination of tasks.

The applicability and generality of the sensor planning algorithm in various synthetic scenarios being aspects of the present invention have been illustrated in this section. Next, some real scenarios will be considered.

Real Scenes

First a sensor planning in a small controlled environment is considered as shown in FIGS. 8, 9, 10 and 11. In the first experiment, face detection is maximized, while in the second one, person detection will be maximized via background subtraction and grouping. An off-the-shelf face detector from OpenCV is utilized and its performance will be characterized over different camera distances and person orientations and shown in the following tables. The first table provides Face Detection Rates for different distances from the cameras. Additionally, detection rates reduced by about 30% from frontal to the side view. This information was used by the sensor planner in the quality function.

| | Distance | | | | | |
|---|---|---|---|---|---|---|
| | 1.8 m–2.5 m | 2.5 m–31. m | 3.1 m–3.8 m | 3.8 m–4.5 m | 4.5 m–5.2 m | 5.2 m–6 m | >6 m |
| Face Detection Rate | 97.5% | 94% | 92.5% | 85% | 77% | 40% | 0% |

The following table provides Detection rates predicted by the algorithm compared with the actual rates obtained from experimental data.

| | Face Detection | | Person Detection | |
|---|---|---|---|---|
| | w/ planning | w/o planning | w/ planning | w/o planning |
| Predicted | 53.6% | 48% | 92% | 83% |
| Actual | 51.33% | 42% | 85% | 75% |

Figure 8:
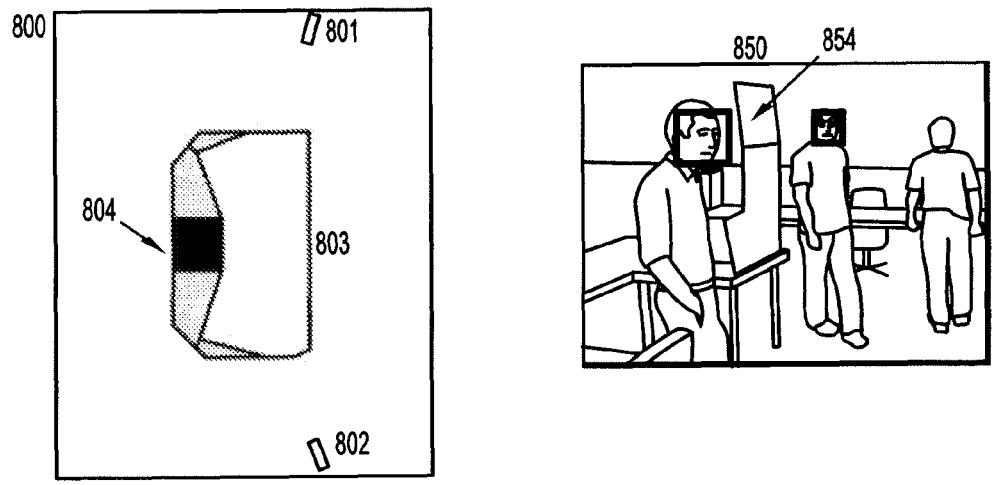
FIG. 8 illustrates one camera scenario in accordance with an aspect of the present invention.
Figure 9:
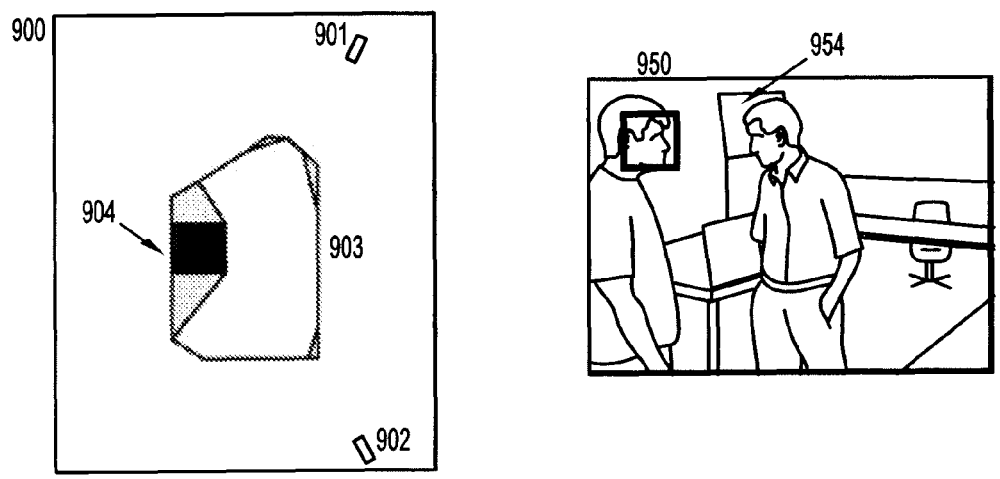
FIG. 9 illustrates a camera scenario selected by a human operator.
Figure 10:
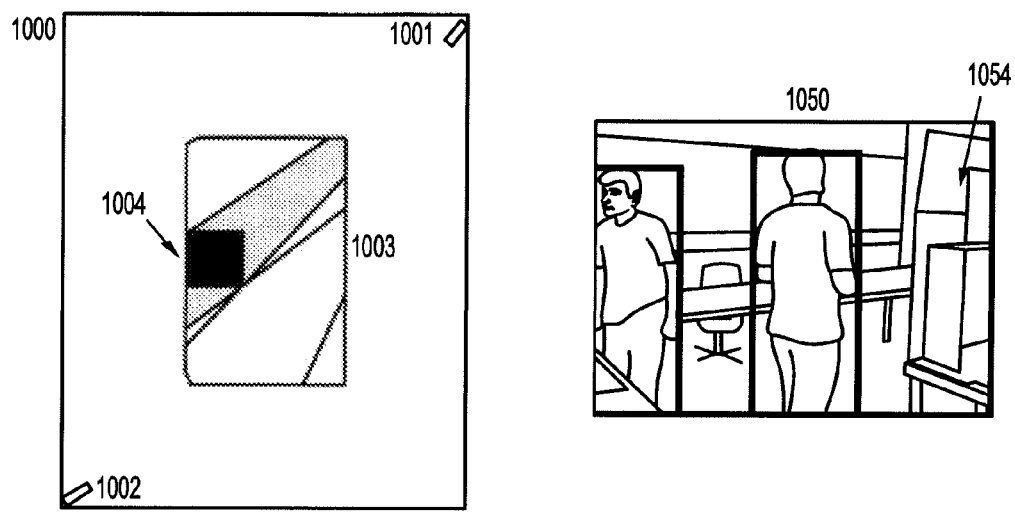
FIG. 10 illustrates another camera scenario in accordance with an aspect of the present invention.
Figure 11:
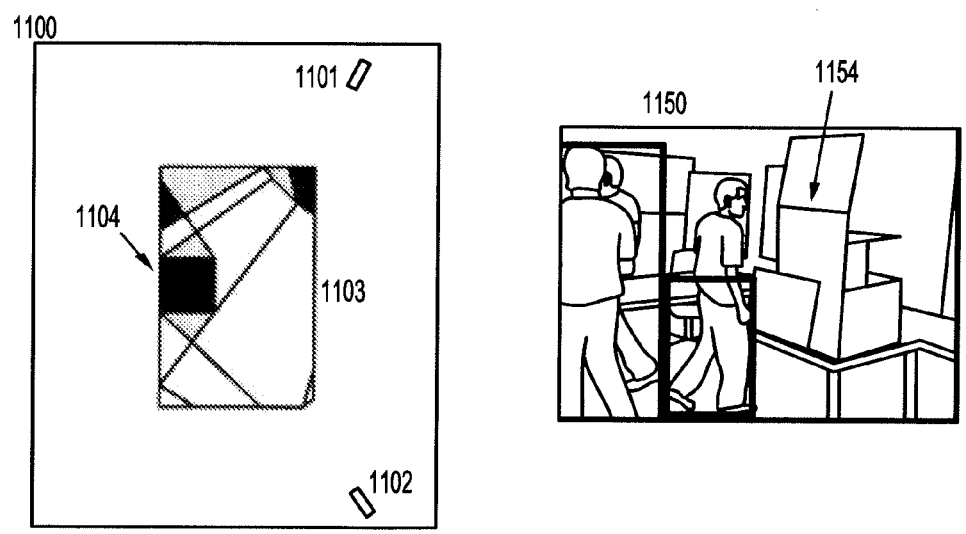
FIG. 11 illustrates another camera scenario selected by a human operator.

This provides the quality function that is needed for the sensor planner. Cameras were then placed in the optimum sensor configuration thus obtained and face detection was performed on the video data. Also a person was asked to try to position the cameras manually and the experiments were conducted with this configuration as well. Results of the experiments are presented in FIGS. 8, 9, 10 and 11. Boxes around people in images 850, 950, 1050 and 1150 indicate detection. The FIGS. 8, 9, 10 and 11 have a diagram (800, 900, 1000 and 1100) showing the lay-out of the room with an obstacle and the positioning of cameras. Detection probability areas are identified and look like mosaics (803, 903, 1003 and 1103), wherein lighter areas are areas with a higher probability. For reasons of display the area inside diagrams 800, 900, 1000 and 1100 but outside the mosaics are left white, while in effect they should be black as the detection probability in those areas is 0. One should keep this in mind in reviewing these diagrams. In the next experiment, person detection is maximized by using background subtraction and grouping. An additional constraint that is considered was that the appearance of one of the actors matched with one of the walls, thus making detection in front of it difficult. This condition was then integrated into the quality function. FIG. 8 shows a configuration of two cameras for optimum face detection. FIG. 9 shows a configuration selected by a human operator. Image 850 in FIG. 8 is an image from one of the cameras 801 and 802 as shown in diagram 800. In diagram 800 the mosaic 803 shows the areas with probability of detection, with lighter areas indicating a higher detection probability. Detail 854 is an inserted obstacle in the scene. In FIG. 9 image 950 is an image from one of the cameras 901 and 902 as shown in diagram 900. In diagram 900 mosaic 903 shows the areas with their probability of detection. The lighter areas have the higher probability. Note that one of the faces is not detected because of a large viewing angle. FIG. 10 shows the configuration of two cameras for person detection using background subtraction, where the top wall matches the color of people 33% of the time. Image 1050 is an image from one of the cameras in 1001 and 1002 as identified in diagram 1000. FIG. 11 shows a configuration selected by a human operator. Image 1150 is an image from one of the cameras 1101 and 1102 in diagram 1100 in FIG. 11. Note how the top portion of one person is not detected due to similarity with the background.

Next, camera placement in the lobby of a building is considered where the person densities is estimated over a period of time via a common background subtraction method as described in C. Stauffer and W. E. L. Grimson, "Learning patterns of activity using real-time tracking." in *PAMI*, 22(8): 747-757, August 2000, and a subsequent "foot finding" algorithm. This information was then fed back into the sensor planner to optimize for different objectives as shown in FIG. 12.

Figure 12:
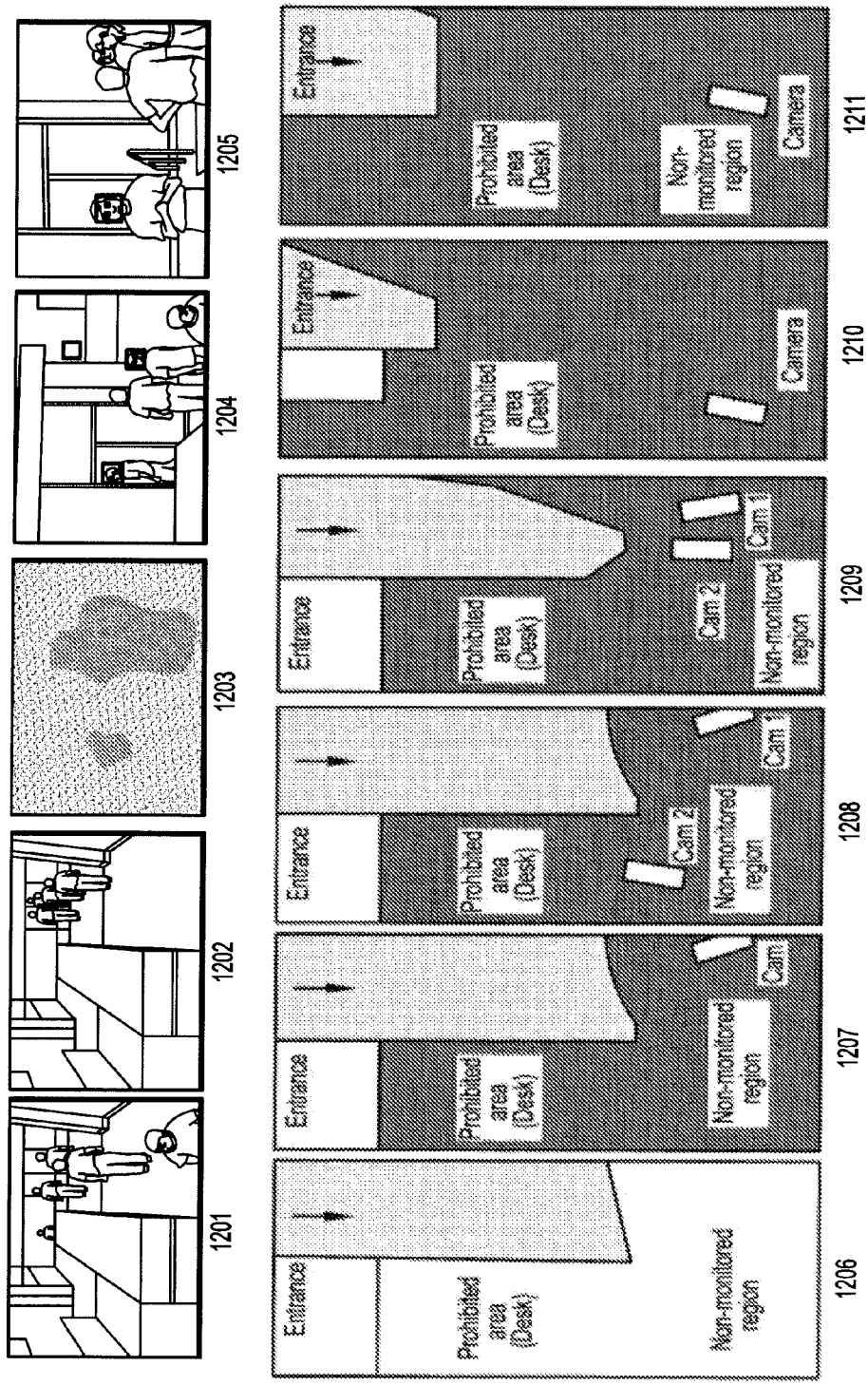
FIG. 12 illustrates sensor placements in a lobby in accordance with different aspects of the present invention.

FIG. 12 comprises a series of images related to sensor placement in a lobby. Images 1201 and 1202 show two views from an original camera location at different times of the day. Image 1203 is a density map obtained via background subtraction (darker represents higher object density). Image 1206 show the mapping of the density map 1203 onto a plan view of the scene. Image 1207 demonstrates optimal object visibility using one camera (72% visibility predicted, 78% obtained). Image 1208 shows optimal sensor placement using two cameras (91% visibility predicted. 93% obtained). Image 1209 shows optimal sensor placement using two cameras and a stereo requirement. Image 1210 shows optimization of face detection for people entering the building (46% detection predicted, 43% obtained). An example of face detection using this sensor setting is shown in image 1204. Image 1211 shows optimization of face detection when the position of the camera cannot be changed (but the direction and zoom can) (33% detection predicted, 35% obtained). An example of face detection using this setting is shown in image 1205.

In Conclusion

Analyses of scenes were performed according to one aspect of the present invention that may contain dynamic objects occluding each other. According to another aspect of the present invention multi-view visibility analysis for such scenes was integrated with user-defined quality criteria based possibly on several static constraints such as image resolution, stereo matching and field of view. In addition to obtaining important performance characteristics of multi-sensor systems, such analysis was further utilized according to a further aspect of the present invention for obtaining optimal sensor configurations. The algorithm can be customized for optimum sensor placement for a variety of existing multi-sensor systems and has applications in several fields, including surveillance where it can be utilized in places such as museums, shopping malls, subway stations and parking lots. Camera systems, such as surveillance systems can be implemented based on configurations determined in accordance with aspects of the present invention and are fully contemplated.

The methods here described can be implemented in a system having a processor, memory to store the instructions of the methods, and an output medium such as a printer, display or a data storage medium to output the results to. The processor can be a part of a PC or a dedicated processor. Further more the instructions to perform the methods here provided as an aspect of the present invention can be stored on a data storage medium such as an optical disk or a magnetic medium or any other medium that can store or represent electronic data.

The following references provide background information generally related to the present invention and are hereby incorporated by reference: [1] Q. Cai and J. K. Aggarwal, "Tracking human motion in structured environments using a distributed-camera system." in *PAMI*, 21(11): 1241-1247. November 1999. [2] A. Cameron and H. F. Durrant-Whyte, "A bayesian approach to optimal sensor placement." in *IJRR*, 9(5):70-88, 1990. [3] Xing Chen and James Davis, "Camera placement considering occlusion for robust motion capture." Technical Report CS-TR-2000-07, Stanford University, December 2000. [4] R. T. Collins, A. J. Lipton, H. Fujiyoshi, and T. Kanade, "Algorithms for cooperative multisensor surveillance." in *Proceedings of the IEEE*, 89(10): 1456-1477, October 2001. [5] D. J. Cook, P. Gmytrasiewicz, and L. B. Holder, "Decision-theoretic cooperative sensor planning." in *PAMI*, 18(10): 1013-1023, October 1996. [6] C. K. Cowan and P. D. Kovesi, "Automatic sensor placement from vision last requirements." in *PAMI*, 10(3): 407-416, May 1988. [7] T. J. Darrell, 0. Demirdjian, N. Checka, and P. F. Felzenszwalb, "Plan-view trajectory estimation with dense stereo background models." in *ICCV*, pages II: 628-635, Vancouver, Canada, July 2001. [8] H. González-Banos and J. C. Latombe, "A randomized art-gallery algorithm for sensor placement." in *SCG*, Medford, Mass., June 2001. [9] G. Hager and M. Mintz, "Computational methods for task-directed sensor data fusion and sensor planning." in *IJRR*, 10(4):285-313. August 1991. [10] L. Ingber, "Very fast simulated re-annealing." in *Mathematical Computer Modeling*, 12: 967-973, 1989. [11] S. B. Kang, S. M. Seitz, and P. P. Sloan, "Visual tunnel analysis for visibility prediction and camera planning." in *CVPR, pages II:* 195-202, Hilton Head, S.C. June 2000. [12] S. Khan and M. Shah, "Consistent labeling of tracked objects in multiple cameras with overlapping fields of view." in *PAMI*, 25(10): 1355-1360, October 2003. [13] K. N. Kutulakos and C. R. Dyer, "Recovering shape by purposive viewpoint adjustment." in *IJCV,* 12(2-3): 113-136, April 1994. [14] J. Mayer and R. K. Bajcsy, "Occlusions as a guide for planning the next view." in *PAMI*, 15(5): 417-433, May 1993. [15] A. Mittal and L. S. Davis, "M2tracker: A multi-view approach to segmenting and tracking people in a cluttered scene." in *IJCV,* 51(3):189-203, February 2003. [16] A. Mittal and L. S. Davis, "Visibility analysis and sensor planning in dynamic environments." in *ECCV*, page III: 543 ff., Prague, Czech Republic, May 2004. [17] J. Miura and K. Ikeuchi, "Task-oriented generation of visual sensing strategies." in *ICCV*, pages 1106-1113, Boston, Mass., 1995. [18] Joseph O'Rourke, "*Art Gallery Theorems and Algorithms.*" Oxford University Press, August 1987. [19] A. Rahimi, B. Dunagan, and T. J. Darrell, "Simultaneous calibration and hacking with a network of non-overlapping sensors." in *CVPR*, pages I: 187-194. 2004. [20] M. K. Reed and P. K. Allen, "Constraint-based sensor planning for scene modeling." in *PAMI*, 22(12): 1460-1467. December 2000. [21] Yi Shang, "*Global Search Methods for Solving Nonlinear Optimization Problems.*", PhD thesis, University of Illinois at Urbana-Champaign, 1997. [22] J. Spletzer and C. J. Taylor, "A framework for sensor planning and control with applications to vision guided multi-robot systems." in *CVPR* , Kauai, Hi., 2001. [23] C. Stauffer and W. E. L. Grimson, "Learning patterns of activity using real-time tracking." in *PAMI*, 22(8):

747-757, August 2000. [24] K. Tarabanis, R. Y. Tsai, and A. Kaul, "Computing occlusion-free viewpoints." in *PAMI*, 18(3): 279-292, March 1996. [25] Y. Ye and J. K. Tsotsos, "Sensor planning for 3d object search." in *CVIU*, 73(2):145-168, February 1999. [26] S. K. Yi, R. M. Haralick, and L. G. Shapiro, "Optimal sensor and light-source positioning for machine vision." in *CVIU*, 61(1): 122-137, January 1995.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for determining an optimal sensor configuration in a vision system, comprising:
    a processor determining a capture quality function of an object at a plurality of locations for each of a plurality of sensor configurations, wherein the capture quality function depends non-uniformly upon an orientation of the object;
    for each of the plurality of sensor configurations, the processor using the capture quality function determined at the plurality of locations to determine a cost function;
    the processor determining an optimal sensor configuration based on the cost function determined for each of the plurality of sensor configurations; and wherein
    the cost function is provided by $$C(s) = -\int_{R_i}\int_0^{2\pi} \lambda(x, \theta) q_s(x, \theta) d\theta dx,$$

wherein
    C(s) represents the cost function,
    s represents a parameter vector of a sensor,
    λ represents an object density,
    x represents a location,
    θ represents the orientation of the object,
    $q_s$ is the capture quality function, and
    $R_i$ represents a region associated with sensor i.

2. The method as claimed in claim 1, wherein the sensors are cameras.

3. The method as claimed in claim 1, wherein the capture quality function depends on probabilities associated with an event set of objects.

4. The method as claimed in claim 1, wherein an optimal sensor configuration is determined by applying a Simulated Annealing algorithm on the cost function.

5. The method as claimed in claim 1, wherein objects are dynamic and may occlude each other.

6. The method as claimed in claim 1, wherein a sensor configuration is constrained by one or more of a set of constraints.

7. The method as claimed in claim 6, wherein the set of constraints comprises:
    image resolution;
    stereo matching;
    face recognition;
    person detection; and
    field of view.

8. The method as claimed in claim 1, further comprising application in a surveillance system.

9. A vision system, comprising a plurality of sensors and a processor enabled to determine a location for each of the plurality of sensors by performing the steps:
    (a) determining a capture quality function of an object at a plurality of locations for each of a plurality of sensor configurations, wherein the capture quality function depends non-uniformly upon an orientation of the object;
    (b) for each of the plurality of sensor configurations, using the capture quality function determined at the plurality of locations to determine a cost function, wherein the cost function is provided by $$C(s) = -\int_{R_i}\int_0^{2\pi} \lambda(x, \theta) q_s(x, \theta) d\theta dx,$$

wherein
    C(s) represents the cost function,
    s represents a parameter vector of a sensor,
    λ represents an object density,
    x represents a location,
    θ represents the orientation of the object,
    $q_s$ is the capture quality function, and
    $R_i$ represents a region associated with sensor i; and
    (c) determining an optimal sensor configuration based on the cost function determined for each of the plurality of sensor configurations.

10. The vision system as claimed in claim 9, wherein the sensors are cameras.

11. The system as claimed in claim 9, wherein the capture quality function depends on probabilities associated with an event set of objects.

12. The vision system as claimed in claim 9, wherein an optimal sensor configuration is determined by applying a Simulated Annealing algorithm on the cost function.

13. The vision system as claimed in claim 9, wherein objects are dynamic and may occlude each other.

14. The vision system as claimed in claim 9, wherein a sensor configuration is constrained by one or more of a set of constraints.

15. The vision system as claimed in claim 9, wherein the set of constraints comprises:
    image resolution;
    stereo matching;
    face recognition;
    person detection; and
    field of view.

16. The vision system as claimed in claim 9, further comprising application in a surveillance system.

17. The vision system as claimed in claim 15, further comprising a surveillance system in one or more settings including: a museum; a shopping mall; a subway station; or a parking lot.

* * * * *